United States Patent [19]
Ikeda et al.

[11] Patent Number: 4,749,340
[45] Date of Patent: Jun. 7, 1988

[54] PISTON TYPE COMPRESSOR WITH IMPROVED SUCTION REED VALVE STOPPER

[75] Inventors: Hayato Ikeda; Hiroshi Onomura; Masahiro Sawada, all of Kariya, Japan

[73] Assignee: Kabushiki Kaisha Toyoda Jidoshokki Seisakusho, Aichi, Japan

[21] Appl. No.: 921,001

[22] Filed: Oct. 17, 1986

[30] Foreign Application Priority Data

Oct. 21, 1985 [JP] Japan ............... 60-161102[U]

[51] Int. Cl.⁴ ................. F04B 27/08; F16K 15/16
[52] U.S. Cl. .................... 417/269; 417/569; 137/856; 137/514
[58] Field of Search ............ 417/269, 559, 565, 569, 417/571; 137/514, 855, 856

[56] References Cited

U.S. PATENT DOCUMENTS

| | | | |
|---|---|---|---|
| 2,338,544 | 1/1944 | Scattoloni | 417/569 |
| 2,908,287 | 10/1959 | Augustin | 137/856 |
| 3,241,748 | 3/1966 | Cramer et al. | 417/571 X |
| 4,283,166 | 8/1981 | Hiraga | 417/269 |
| 4,403,921 | 9/1983 | Kato et al. | 417/296 |
| 4,428,718 | 1/1984 | Skinner | 417/222 |
| 4,537,566 | 8/1985 | Blass et al. | 417/569 |
| 4,642,037 | 2/1987 | Fritchman | 417/571 |

FOREIGN PATENT DOCUMENTS

| | | | |
|---|---|---|---|
| 3414329 | 1/1985 | Fed. Rep. of Germany | 417/569 |
| 97974 | 6/1982 | Japan | 417/269 |
| 2083566 | 3/1982 | United Kingdom | 417/571 |
| 449509 | 6/1975 | U.S.S.R. | 137/855 |

Primary Examiner—William L. Freeh
Assistant Examiner—Paul F. Neils
Attorney, Agent, or Firm—Burgess, Ryan and Wayne

[57] ABSTRACT

A piston type compressor having a cylinder block in which a plurality of compression chambers permit a plurality of pistons to be reciprocated so as to compress a refrigerant sucked from a suction chamber formed in an end housing into the compression chambers through suction ports of a valve plate openably closed by a plurality of suction reed valves. The compressor also has a valve stop construction for stopping the movement of the suction reed valves when the valves reach the opening position thereof apart from the valve plate. The valve stop construction includes recessed seats formed in an axial end face of the cylinder block so as to permit a portion of the free end of respective suction reed valves to be first seated on the recessed seats, and to permit the remaining portion of the free end of the suction reed valves to be stably seated on the recessed seats. The gradual stoppage of the suction reed valves suppresses vibration of the valves and prevents noise.

9 Claims, 8 Drawing Sheets

PISTON TYPE COMPRESSOR WITH IMPROVED SUCTION REED VALVE STOPPER

BACKGROUND OF THE INVENTION

1. Field of the Invention

The present invention relates to a piston type compressor with a suction reed valve stopper, adapted for use in a unit for air-conditioning a vehicle passenger compartment, and more particularly, to a piston type compressor with a suction reed valve stopper which stops the movement of the suction reed valve during each suction stroke of the pistons while acquiring an adequate amount of opening for refrigerant suction and suppressing noisy vibration of the suction reed valves.

2. Description of the Related Art

Many piston type compressors, such as a swash plate type compressor and a wobble plate type compressor are known. For example, U.S. Pat. Nos. 4,403,921 to Kato et al discloses a swash plate type compressor with a double-acting reciprocatory pistons and a suction reed valve mechanism; and 4,428,718 to Skinner discloses a wobble plate type compressor with compressing pistons and suction reed valves formed integrally with a suction valve disk. For example, the known swash plate type compressor of U.S. Pat. No. 4,403,921 includes a cylinder block having therein a plurality of cylinder bores serving as compression chambers for permitting pistons to be reciprocated therein to compress a refrigerant gas. The ends of the cylinder block are closed by front and rear housings, via valve plates, respectively, so that suction and discharge chambers are formed in each of the front and rear housings. The suction chambers are fluidly communicated with the compression chambers through suction ports formed in the valve plates and suction reed valves arranged on an inner side of respective valve plates, and the discharge chambers are fluidly communicated with the compression chambers through discharge ports formed in the same valve plates and discharge valves arranged on an outer side of respective valve plates. The valve plates are also formed with inlet ports for permitting a refrigerant gas returning from the outer air-conditioning circuit to flow into the suction chambers, and outlet ports for permitting a compressed refrigerant gas to flow from the discharge chambers into the air-conditioning circuit. The suction reed valves which are formed integrally with a suction valve disk made of resilient metallic material, such as a stainless steel plate, have a thickness of between 0.2 and 0.4 mm and are formed to be resiliently movable between a closed position in which they are in contact with the valve plates for closing the suction ports and an opening position in which the suction reed valves are apart from the valve plates for opening the suction ports. When the suction reed valves are moved to the opening position, the end of each suction reed valve abuts against a stop formed as a recessed seat in the axial end face of the cylinder block. That is, the amount of movement of the suction reed valves is determined by the depth of the recessed seat from the axial end face of the cylinder block. The conventional depth of the recessed seat acting as the stop is set at approximately 1.4 mm, and the seating surface of the recessed seat is formed as a plane surface in parallel with the valve plates. However, it was found that the conventional construction of the suction reed valve stop formed as the recessed seat brings about such a problem wherein during each process of the movement of the suction reed valves from the closing position in contact with the valve plates to the opening position abutting against the bottom of the recessed seats, the suction reed valves are subjected to a self-excited vibration caused by the flow of a refrigerant sucked into the compression chambers due to the suction stroke of the pistons. The vibration causes sound or noise to be generated at the evaporator of the air-conditioning circuit. Particularly, when the compressor is in an operating condition such that the amount of circulating flow of refrigerant in the air-conditioning circuit is small, i.e., either during idle operation of the compressor or during operation at a low rotational speed, the end of each suction reed valve is not sufficiently moved to the opening position in which it is stably seated on and stopped by the bottom of the recessed seat, and accordingly, the suction reed valve is subjected to irregular vibration under the influence of a change in the flow of refrigerant gas sucked into the compression chamber. As a result, the vibration of the suction reed valves causes a sound or clatter.

On the other hand, if the depth of each recessed seat is reduced, for example, to less than 1 mm, the above-mentioned vibration might be suppressed. But, since the amount of movement of the suction reed valves from the closed position to the opening position must be decreased, a sufficient refrigerant cannot be then introduced into the compression chambers during the suction stroke of the pistons, and accordingly, the refrigerant gas in the compression chambers is subjected to an excess compression, and the temperature of the discharged refrigerant unfavorably rises.

SUMMARY OF THE INVENTION

An object of the present invention is to eliminate the above-mentioned defects encountered by the conventional piston type compressor with suction reed valves.

Another object of the present invention is to provide a piston type compressor provided with an improved stopper construction for suppressing vibration of the suction reed valves and allowing a sufficient amount of refrigerant gas to flow into the compression chambers during the suction stroke of the pistons.

A further object of the present invention is to provide a piston type compressor adapted to be used for forming a quiet air-conditioning system.

In accordance with one aspect of the present invention, there is provided a piston type compressor which includes: a cylinder block having therein a plurality of axial cylinder bores formed as compression chambers for permitting therein pistons to be reciprocated to compress a refrigerant gas; at least a housing closing an axial end of the cylinder block for forming a suction chamber receiving therein a refrigerant gas to be compressed and a discharge chamber for receiving a compressed refrigerant gas; a valve plate having an inlet port for introducing the refrigerant gas to be compressed from an outer air-conditioning circuit into the suction chamber, a suction port for fluidly communicating between the suction chamber and the compression chambers, an outlet port for discharging the compressed refrigerant from the discharge chamber toward the outer air-conditioning circuit, and a discharge port for fluidly communicating between the discharge chamber and the compression chambers; a discharge valve means arranged on one end face of the valve plate for openably closing the discharge port of the valve plate; a suction reed valve means arranged on the other end face of the valve plate and having a plurality of suction reed valves adapted to be moved between a closing position being in contact with the valve plate for closing the suction port and an opening position apart from the valve plate for opening the suction port, each suction reed valve having a substantial length extending a diametrical direction of a corresponding one of the cylinder bores and being formed with a free end thereof; and, a stop means formed as a plurality of recessed seats in the axial end face of the cylinder block for stopping the free end of each of the plurality of suction reed valves when each suction reed valve is moved to the opening position. The compressor is characterized in that each recessed seat of the stop means is formed with a first seat portion against which a first corner of the free end of each suction reed valve abuts while being separated from the other end face of the valve plate by a first distance, and a second seat portion against which a second corner of the free end of each suction reed valve abuts while being separated from the other end face of the valve plate by a second distance different from the first distance.

In accordance with another aspect of the present invention, there is provided a piston type compressor which includes: a cylinder block having therein a plurality of axial cylinder bores formed as compression chambers for permitting therein pistons to be reciprocated to compress a refrigerant gas; at least a housing closing an axial end of the cylinder block for forming a suction chamber receiving therein a refrigerant gas to be compressed and a discharge chamber for receiving a compressed refrigerant gas; a valve plate having an inlet port for introducing the refrigerant gas to be compressed from an outer air-conditioning circuit into the suction chamber, a suction port for fluidly communicating between the suction chamber and the compression chambers, an outlet port for discharging the compressed refrigerant from the discharge chamber toward the outer air-conditioning circuit and a discharge port for fluidly communicating between the discharge chamber and the compression chambers; a discharge valve means arranged on one end face of the valve plate for openably closing the discharge port of the valve plate; a suction reed valve means arranged on the other end face of the valve plate and having a plurality of suction reed valves adapted to be moved between a closing position being in contact with the valve plate for closing the suction port and an opening position apart from the valve plate for opening the suction port, each suction reed valve having a substantial length extending in a diametrical direction of corresponding one of the cylinder bores and being formed with a free end thereof; and, a stop means formed as a plurality of recessed seats in the axial end face of the cylinder block for stopping the free end of each of the plurality of suction reed valves when each suction reed valve is moved to the opening position. The compressor is characterized in that each of the plurality of recessed seat is a single recess having an inner end continuing to the edge of the respective one of the cylinder bores, an outer end being distant from the edge of the respective one of the cylinder bores, and a seat surface extending between the inner and outer ends and inclined in such a manner that axial depth of the inner end of the single recess is deeper than that of the outer end of the single recess, whereby when the free end of each suction reed valve is stopped by each of the plurality of recessed seat, a distance between each suction reed valve and the valve plate gradually increases from an outer edge of the free end of each suction reed valve toward a longitudinally inner portion of each suction reed valve.

BRIEF DESCRIPTION OF THE DRAWINGS

The above and other objects, features and advantages of the present invention will become apparent from the ensuing description of the embodiments illustrated in the accompanying drawings wherein.

DESCRIPTION OF THE PREFERRED EMBODIMENTS

Figure 1:
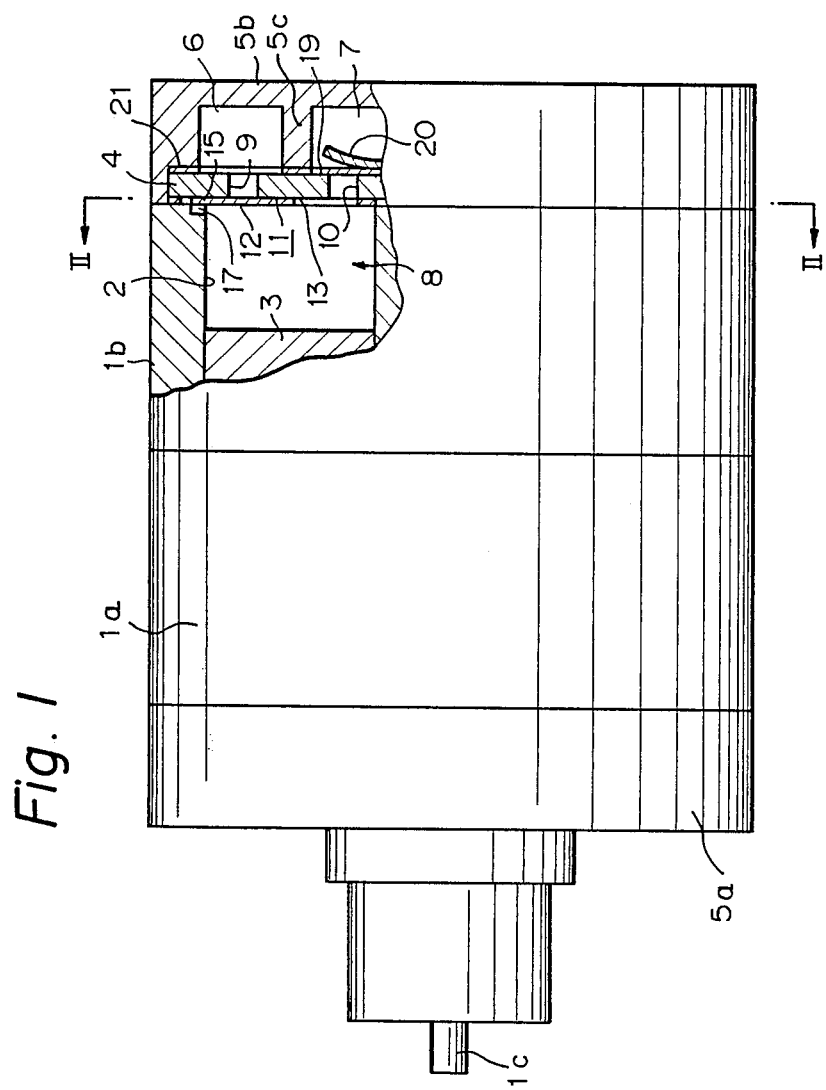
FIG. 1 is a partly broken front view of a typical example of a swash plate-operated piston type compressor in which a suction reed valve stop construction, according to the present invention is accommodated.
Figure 2:
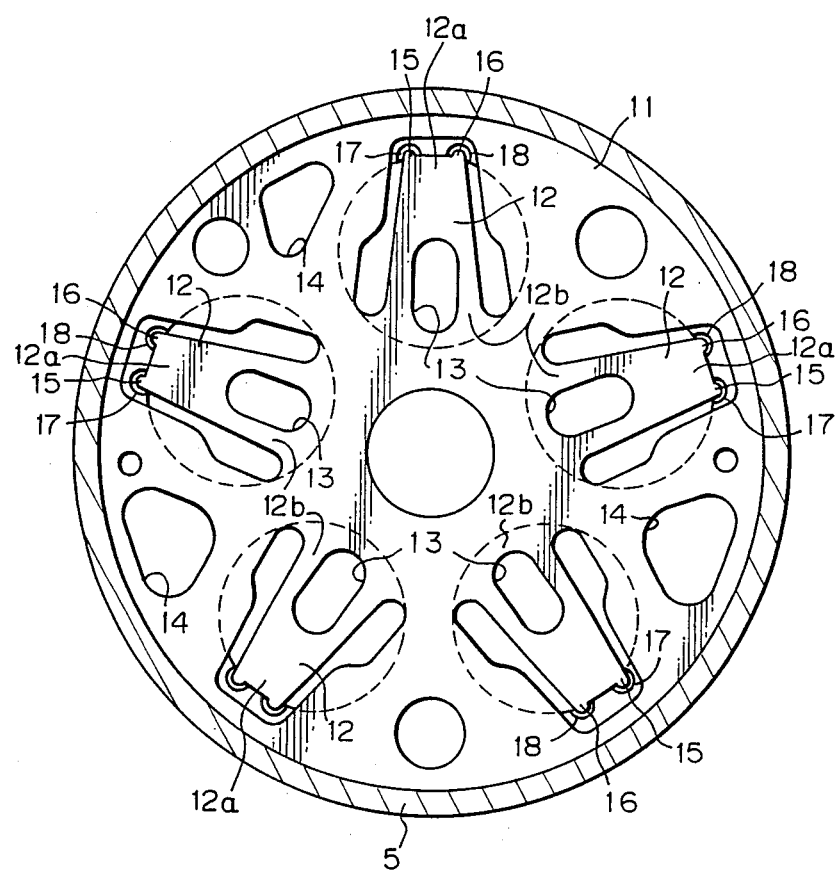
FIG. 2 is a cross-sectional view taken along the line II—II of FIG. 1.

Referring to FIG. 1, a swash plate-operated piston type compressor has a front and a rear cylinder block 1a and 1b combined together so as to form an integral cylinder block provided therein with a plurality of axial cylinder bores 2 arranged in parallel with a central axis of a drive shaft 1c on which a swash plate (not illustrated) is keyed. In the cylinder bores 2, double-acting pistons 3 are received so as to be reciprocated to compress a refrigerant gas having returned from an outer air-conditioning circuit. The reciprocation of the pistons 3 is caused by the rotation of the swash plate driven by the drive shaft 1c. An axial end of the front cylinder block 1a is closed by a front housing 5a, and an axial end of the rear cylinder block 1b is closed by a rear housing 5b. The front and rear housings 5a and 5b are connected to the corresponding axial ends of the front and rear cylinder blocks 1a and 1b, via valve plates (only the rear valve plate 4 is illustrated in FIG. 1). Each of the front and rear housings 5a and 5b includes therein a suction chamber for receiving a refrigerant gas to be compressed, and a discharge chamber for receiving a compressed refrigerant gas. Thus, the front side of the compressor assumes a half of the entire compression capacity and the rear side of the compressor assumes the remaining half.

FIG. 1 typically illustrates the inner construction of the rear side of the compressor. Note, a like construction is arranged in the front side of the compressor.

As illustrated in FIG. 1, the rear housing 5b forms therein a suction chamber 6 and a discharge chamber 7 isolated from one another by a wall 5c. These suction and discharge chambers 6 and 7 are fluidly connectable to the outer air-conditioning circuit by means of suitable conduits. The valve plate 4 is formed with a plurality of suction ports 9 for providing a fluid communication between the suction chamber 6 and the cylinder bores 2 serving as compression chambers, during the suction stroke of the pistons 3, and with a plurality of discharge ports 10 for providing a fluid communication between the discharge chamber 7 and the cylinder bores 2 during the discharge stroke of the pistons 3. The valve plate 4 is also formed with a selected number of inlet ports (not illustrated in FIG. 1) for permitting the refrigerant gas to flow into the suction chamber 6 when returned from the air-conditioning circuit, and a selected number of outlet ports (not illustrated) for discharging the compressed refrigerant from the discharge chamber 7 toward the air-conditioning circuit. A suction valve disk 11 made of an elastic steel plate, such as a stainless steel plate of 0.2 through 0.4 thickness, is intervened between the axial end of the rear cylinder block 1b and an inner end face of the valve plate 4. Formation of the suction valve disk 11 is achieved by the known press machine.

Referring to FIGS. 2 through 6, in addition to FIG. 1, the suction valve disk 11 is formed with a plurality of suction reed valves 12 in positions corresponding to the above-mentioned plurality of suction ports 9. Each of the suction reed valves 12 has a free end 12a, and a substantial length extending from a base portion 12b toward the free end 12a along a diametrical direction of the corresponding cylinder bore 2. The suction valve disk 11 is also formed with a plurality of elongated openings 13 in the base portions 12b so as to be in alignment with the discharge ports 10 of the valve plate 4, and a selected number of inlet openings 14 (FIG. 2) for introducing a refrigerant gas to be compressed into the suction chamber 6. The free end 12a of each suction reed valve 12 is provided, at two corners thereof, with a pair of arc-shaped tongues 15 and 16. Note, the tongue 15 is in the vicinity of one of the above-mentioned inlet openings 14, and the tongue 16 is far from the same inlet opening 14.

On the other hand, the axial end face of the rear cylinder block 1b to which the valve plate 4 is connected is provided with a first group of valve stops 17 in the shape of semi-circularly recessed seats 17a for stopping the tongues 15 of the free ends 12a of the suction reed valves 12, and a second group of valve stops 18 in the shape of semi-circularly recessed seats 17a for stopping the tongues 16 of the free ends 12a of the suction reed valves 12. Note, the valve stops 17 and 18 are both arranged adjacent to the edge of the cylinder bores 2 and remote from the center of the rear cylinder block 1b. Preferably, the depth L1 (FIG. 5) of the recessed seat 17a of each valve stop 17 from the axial end face of the rear cylinder block 1b is approximately 1 mm, and the depth L2 (FIG. 5) of the recessed seat 18a of each valve stop 18 from the axial end face of the rear cylinder block 1b is approximately 1.4 mm. Thus, when the suction reed valves 12 are moved so as to open respective suction ports 9, the tongues 15 of the free ends 12a of the suction reed valves 12 are first stopped by the recessed seats 17a of the valve stops 17, and subsequently, the tongues 16 of the free ends 12a of the suction reed valves 12 are stopped by the recessed seats 18a of the valve stops 18. Note, as soon as the tongues 15 abut against the less deep recessed seats 17a of the valve stops 17 during the suction stroke of the pistons 3, vibration of the suction reed valves 12 is suppressed. When both tongues 15 and 16 abut against the recessed seats 17a and 18a of the valve stops 17 and 18, the suction reed valves 12 are stably held at their open positions.

In the discharge chamber 7 of the rear housing 5b, a discharge valve 19 and a valve retainer 20 are arranged. A packing 21 is disposed between the valve plate 4 and the rear housing 5b, as shown in FIG. 1.

Figure 18:
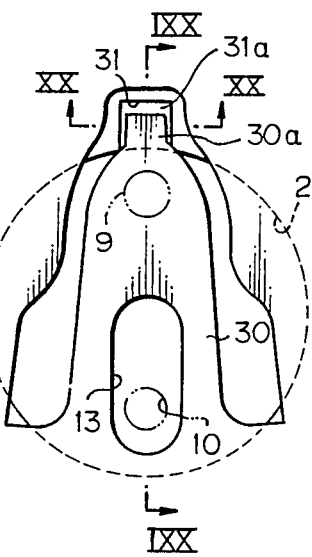
FIG. 18 is a partial front view of one suction reed valve and a suction reed valve stop construction according to the prior art.
Figure 19:
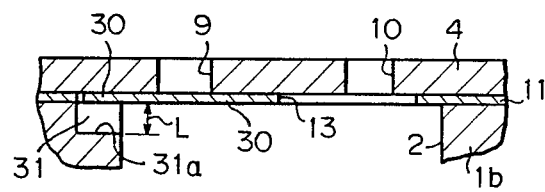
FIG. 19 is a cross-sectional view taken along the line XIX—XIX of FIG. 18.
Figure 20:
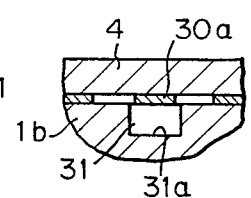
FIG. 20 is a cross-sectional view taken along the line XX—XX of FIG. 18.

At this stage, the valve stop construction for the suction reed valve, according to the prior art is described hereinbelow with reference to FIGS. 18 through 20, in which the same reference numerals as in FIGS. 1 through 6 designate the same elements or parts as those in FIGS. 1 through 6. In the prior art, the suction reed valve 30 is formed with a rectangular free end 30a, and a base portion 30b. The suction reed valve 30 extends so as to openably close the corresponding suction port 9 of the valve plate 4. The opening 13 of the suction reed valve 30 is arranged in alignment with the discharge port 10 of the valve plate 4. The rear cylinder block 1b is formed with a valve stop 31 in the form of a recessed rectangular seat 31a which is arranged adjacent to an edge of the corresponding cylinder bore 2, as best shown in FIG. 18. The recessed rectangular seat 31a (the depth L is set to 1.4 mm from the axial end face of the rear cylinder block 1b) of the valve seat 31 has a plane seat surface (see FIGS. 19 and 20) in parallel with the valve plate 4, and acts to stop the rectangular free end 30a of the suction reed valve 30 when the suction reed valve 30 is moved from the closing position thereof in contact with the valve plate 4 to the opening position thereof for opening the suction port 9 during the suction stroke of the piston 3 in the cylinder bore 2. Therefore, at the initial time of the movement of the suction reed valve 30 from the closing position to the opening position, no portion of the free end 30a of the suction reed valve 30 can abut against the rectangular recessed seat 31a of the valve stop 31. As a result, the free end 30a of the suction reed valve 30 must be subjected to vibration under the influence of a flow of refrigerant gas sucked into the cylinder bore 2 through the open suction port 9. The vibration of the suction reed valve 30 causes a loud sound at the evaporator of the air-conditioning circuit. Further, when the piston type compressor is in an idling running or operates at a low rotational speed, the suction reed valve 30 is not moved to the complete opening position in which the free end 30a abuts against the valve stop 31. As a result, the free end 30a of the suction reed valve 30 irregularly vibrates causing noise in the air-conditioning circuit. The present inventors have contrived to solve the noise problem encountered by the piston type compressor of the prior art.

The operation of the valve stop construction, according to the embodiment of the present invention, as illustrated in FIGS. 1 through 6 will be described hereinafter.

While the piston type compressor of FIG. 1 is running, according to the movement of the pistons 3 in the cylinder bores 2 from their top dead center to their bottom dead center (the suction stroke of the pistons 3), the pressure prevailing in the compression chambers 8 (FIG. 1), i.e., the cylinder bores 2 is lowered in comparison with that prevailing in the suction chamber 6. Therefore, the refrigerant gas in the suction chamber 6 is sucked into the compression chambers 8 through the suction ports 9 while resiliently bending (moving) the suction reed valves 12 toward the open position thereof. When the pistons 3 reach bottom dead center in the cylinder bores 2, the suction of the refrigerant from the suction chamber 6 toward the compression chambers 8 does not take place. As a result, the suction reed valves 12 are resiliently restored to the original closing position in contact with the valve plate 4 so as to close the suction port 9. Thereafter, the refrigerant gas in the compression chambers 8 is subjected to compression by the pistons 3 during the compression stroke of the pistons 3 (the pistons 3 move from their bottom dead center to their top dead center). The compressed refrigerant gas is gradually discharged from the compression chambers 8 into the discharge chamber 7 during the compression stroke of the pistons 3.

Figure 6:
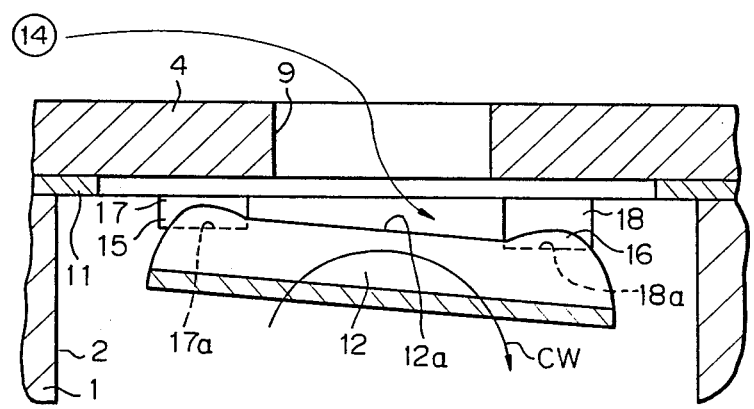
FIG. 6 is an enlarged cross-sectional view taken along the line VI—VI of FIG. 3, illustrating a flow of refrigerant sucked into the compression chamber through an open suction reed valve.

During the suction stroke of the pistons 3, the tongues 15 of the suction reed valves 12 are moved until they first abut against and are stopped by the less deep recessed seats 17a of the valve stops 17, and subsequently, the tongues 16 of the suction reed valves 12 are moved until they abut against and are stopped by the deeper recessed seats 18a of the valve stops 18. Accordingly, as illustrated in FIG. 6, the free end 12a of the suction reed valve 12 is held in a inclined state sloping down from the tongue 15 toward the tongue 16. This inclined state of each suction reed valve 12 provides the maximum opening through which the refrigerant gas is able to flow from the suction chamber 6 into the compression chambers 8, via the suction port 9 of the valve plate 4. Note that, since in the middle of the movement of the suction reed valves 12 before reaching the above-mentioned maximum open state the tongues 15 of the free ends 12a of the suction reed valves 12 are stopped by the recessed seats 17a of the valve stops 17, an irregular vibration of the suction reed valves 12 is successfully suppressed, and accordingly, noise problems due to the vibration of the suction reed valves 12 are solved.

As best illustrated in FIG. 6, in the inclined state of the suction reed valves 12, since the refrigerant gas to be compressed, coming from the inlet openings 14 (FIG. 2) into the suction chamber 6 can smoothly flow into the compression chambers 8 along the inclination of the suction reed valves 12, as shown by an arrow line in FIG. 6, the suction reed valves 12 are able to promote smooth suction of the refrigerant gas into the compression chambers 8.

Figure 3:
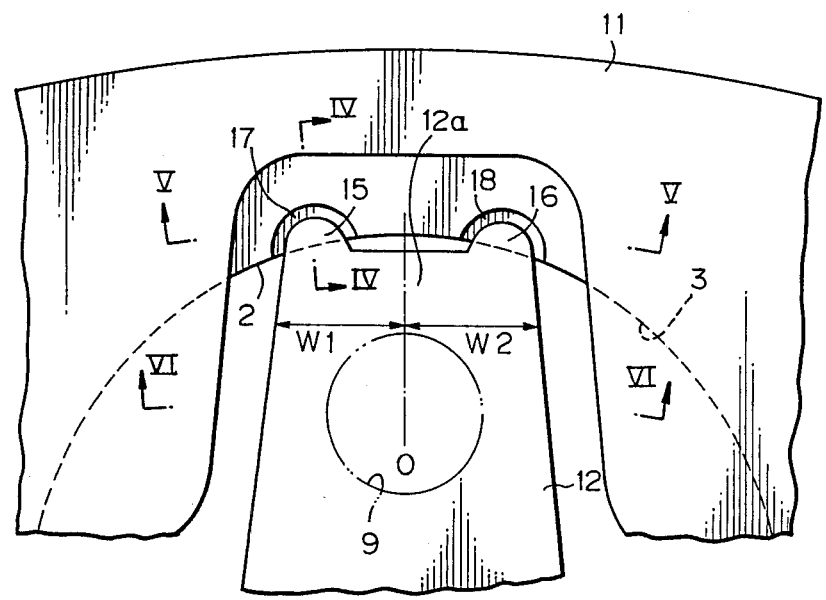
FIG. 3 is an enlarged partial plan view illustrating a free end of a suction reed valve and the suction reed valve stop construction of FIG. 1.
Figure 4:
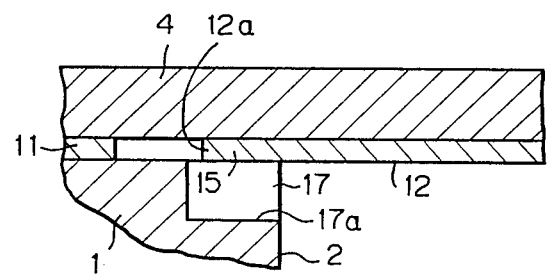
FIG. 4 is an enlarged cross-sectional view taken along the line IV—IV of FIG. 3.
Figure 5:
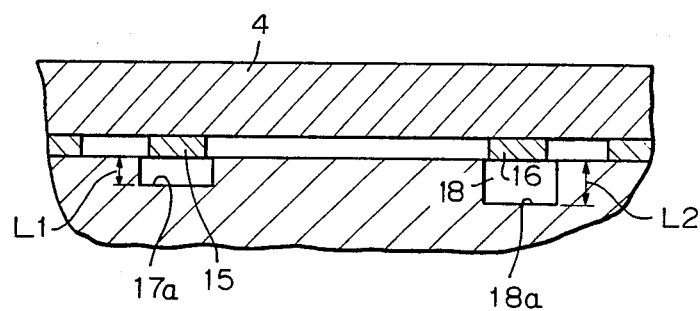
FIG. 5 is an enlarged cross-sectional view taken along the line V—V of FIG. 3.

Preferably, as shown in FIG. 3, the lateral width W1 from the center line "0" to the end of the tongue 15 of each suction reed valve 12 is made smaller than the width W2 from the same center line "0" to the end of the tongue 16. This difference in the two widths(of the suction reed valve 12 provides an advantage. Specifically, after the abutment of the tongue 15 against the recessed seat 17a the free end 12a of the suction reed valve 12 turns about the tongue 15 in the clockwise direction in FIG. 6 until the tongue 16 abuts against the recessed seat 18a. The turning motion of the suction reed valve 12, i.e., the opening motion of the suction reed valve 12, can therefore be smoothly carried out.

Figure 7:
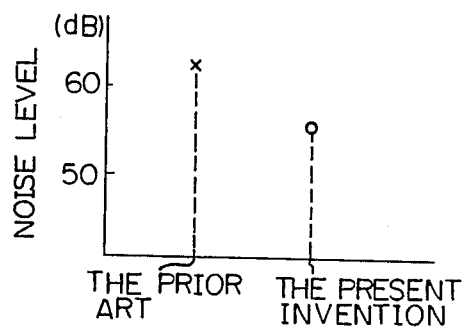
FIG. 7 is a graph showing the result of an experiment conducted for comparing noise levels between the prior art and the present invention.

FIG. 7 shows the result of the experiment conducted by the present inventors for comparing the noise level between the present invention and the prior art. The experiment was conducted under the conditions (1) and (2) below.

(1) The piston type compressor with the suction reed valve stop construction according to the above-mentioned embodiment, and the compressor with the suction reed valve stop construction according to the prior art were both rotated at 800 r.p.m.

(2) The noise levels of the two compressors were measured at the positions of the associated evaporator, respectively.

The noise level of the compressor according to the present invention was 58 dB. On the other hand, the noise level of the compressor according to the prior art was 64 dB. From this result, it will be clearly understood that, according to the present invention, the reduction of the noise level can be achieved. At this stage, it was found that the depth of the less deep recessed seat 17a of the valve stop 17 should be equal to or less than 1.0 mm in order to obtain an effective noise reduction.

Figure 8:
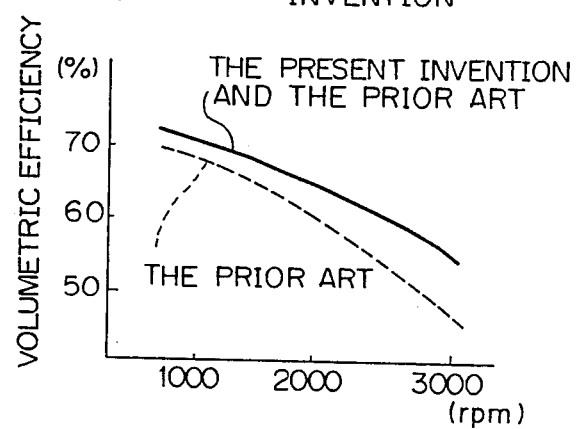
FIG. 8 is a graph showing the result of an experiment conducted for comparing volumetric efficiency in compression between the prior art and the present invention.

FIG. 8 shows the result of the experiment for comparing the volumetric efficiency in compression of the refrigerant gas between the compressors of the present invention and the prior art. It will be understood from FIG. 8 that the volumetric efficiency of the present invention and the prior art is substantially the same as illustrated by the solid curve. On the other hand, the dotted curve in FIG. 8 shows the case where the depth L of the recessed seat 31a of the valve stop 32 of the prior art was set at a valve less than 1.4 mm, i.e., 1.0 mm, and that the volumetric efficiency was degraded. This is because the decrease in the depth of the recessed seat 31a makes it difficult to permit the suction reed valve 30 (FIG. 18) to be sufficiently opened.

Figure 9:
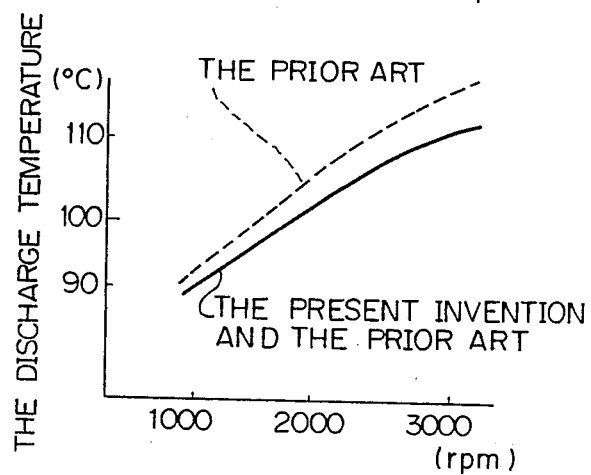
FIG. 9 is a graph showing the result of an experiment conducted for comparing the temperature of a discharged refrigerant between the prior art and the present invention.
Figure 10:
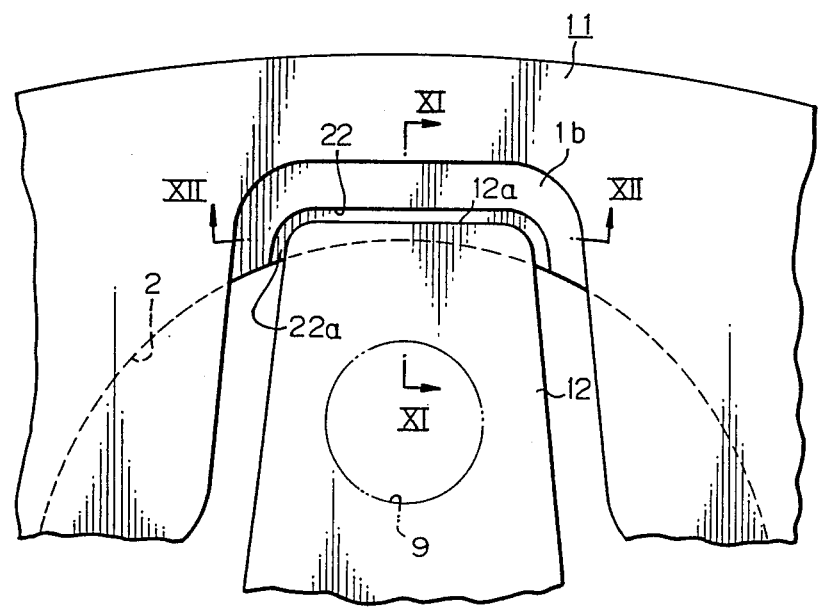
FIG. 10 is a similar view to FIG. 3 illustrating a free end of a suction reed valve and the suction reed valve stop construction, according to another embodiment of the present invention.

FIG. 9 shows the result of the experiment conducted for comparing the discharge temperature of the refrigerant between the compressors of the present invention and the prior art. The solid line in FIG. 9 indicates that a change in the temperature of the refrigerant gas after compression over the rotational speed of the compressor from 1,000 r.p.m. through 3,000 r.p.m. is identical between both cases of the present invention and the prior art. This means that, according to the present invention, an improvement for suppressing noise caused by vibration of the suction reed valves of the piston type compressor can be accomplished without sacrificing the performance of the compressor.

On the other hand, when the depth of the recessed seat 31a of the valve stop 31 of the compressor of the prior art was reduced to 1.0 mm from the conventional 1.4 mm depth, it was found that, as shown by a dotted line in FIG. 9, the temperature of the refrigerant gas discharged from the compressor must have increased over the rotational speed range from 1,000 r.p.m. through 3,000 r.p.m.

FIGS. 10 through 14 illustrate the second embodiment of the present invention.

Figure 11:
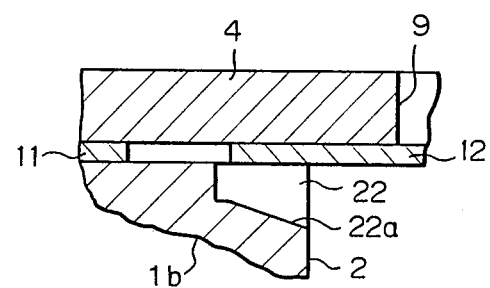
FIG. 11 is cross-sectional view taken along the line XI—XI of FIG. 10.
Figure 12:
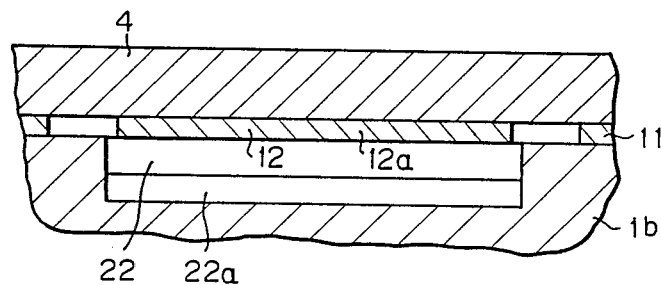
FIG. 12 is a cross-sectional view taken along the line XII—XII of FIG. 10.
Figure 13:
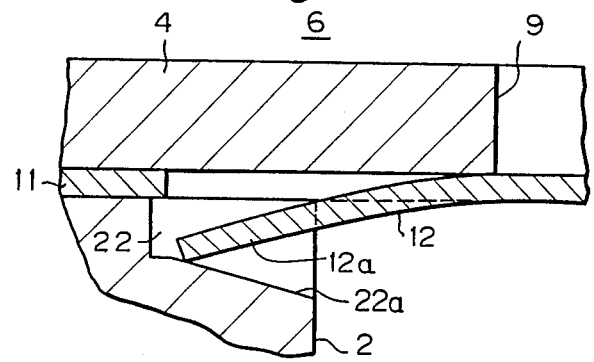
FIGS. 13 and 14 are similar but enlarged views to FIG. 11, illustrating the process of movement of a suction reed valve of the embodiment of FIG. 10.
Figure 14:
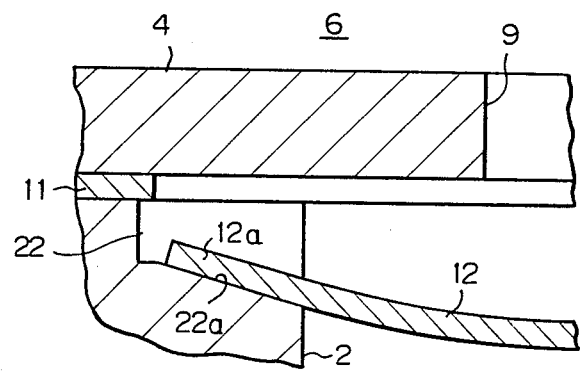

In the second embodiment, the free end 12a of each suction reed valve is stopped by a single valve stop 22 having an elongated recessed seat 22a. The elongated recessed seat 22a of the valve stop 22 has an inclined surface descending from an outer closed edge to an inner open edge continuing to the cylinder bore 2, as best illustrated in FIG. 11. The depth of the outer edge of the inclined surface of the elongated recessed seat 22a from the axial end face of the cylinder block 1b is set at 1.0 mm, and the depth of the inner edge of the inclined surface of the elongated recessed seat 22a from the axial end face of the cylinder block 1b is set at 1.4 mm. Accordingly, when the suction reed valve 12 is moved to the opening position thereof, the frontmost end of the free end 12a of the suction reed valve 12 first abuts against the outer edge of the elongated recessed seat 22a of the valve stop 22. Therefore, the free end 12a of the suction reed valve 12 is prevented from vibrating, and thus the noise level of the compressor is kept at a low level. Subsequently, when the suction reed valve 12 is bent to the complete opening position, the free end 12a of the suction reed valve 12 is stably seated on the inclined surface of the recessed seat 22a of the valve stop 22 as shown in FIG. 14. As a result, the suction port 9 of the valve plate 4 is widely opened so as to permit a sufficient amount of the refrigerant gas to be sucked from the suction chamber 6 into the compression chamber 8. That is, the suction of the refrigerant is at a maximum value.

Figure 15:
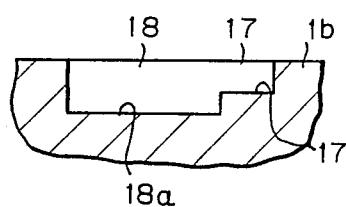
FIGS. 15 through 17 are partial cross-sectional views of stop constructions according to further three embodiments of the present invention.

FIG. 15 illustrates a different embodiment of the present invention in which the first and second recessed seats 17a and 18a of the valve stops 17 and 18 of the first embodiment shown in FIGS. 1 through 6 are modified so as to lie in one common recessed seat. Thus, the two seat portions 17a and 18a are made in the form of a step.

Figure 16:
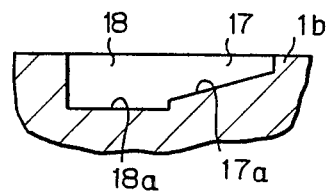

FIG. 16 illustrates a further different embodiment of the present invention in which the less deep recessed seat 17a of the valve stop 17 is inclined toward the deeper recessed seat 18a of the valve stop 18. This construction of the suction reed valve stop permits the tongue 15 of the free end 12a of the suction reed valve 12 to be entirely seated on and stopped by the less deep recessed seat 17a.

Figure 17:
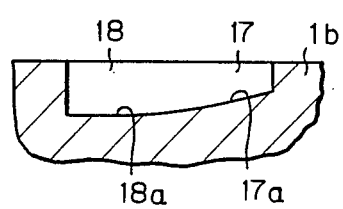

FIG. 17 illustrates a still further embodiment of the present invention in which the first and second recessed seats 17a and 18a of the valve stops 17 and 18 of the first embodiment shown in FIGS. 1 through 6 are modified so as to lie in one common arc-shape recessed seat. This construction of the suction reed valve stop permits both tongues 15 and 16 to be smoothly seated on the arc-shape recessed seat.

Further, it will easily occur to persons skilled in the art that the present invention may be implemented by the suction reed valve stop construction according to the combination of the first embodiment shown in FIGS. 1 through 6 and the second embodiment shown in FIGS. 10 through 14.

From the foregoing description of the preferred embodiments of the present invention, it will be understood that, according to the present invention, the piston type compressor, such as a swash plate type compressor and a wobble plate type compressor, can operate without any vibration of the suction reed valve while maintaining the conventional compressor performance, such as an appropriate volumetric efficiency in the compression of the refrigerant and an appropriate discharge temperature of the compressed gas. Thus, a noise free piston type compressor can be provided by the present invention. Of course, further modifications and variations will be possible without departing from the spirit and scope of the present invention claimed in the appended claims.

We claim:

1. A piston type compressor including:

a cylinder block having therein a plurality of axial cylinder bores formed as compression chambers for permitting pistons therein to be reciprocated to compress a refrigerant gas;

at least a housing closing an axial end of said cylinder block for forming a suction chamber receiving therein a refrigerant gas to be compressed and a discharge chamber for receiving a compressed refrigerant gas;

a valve plate having an inlet port for introducing the refrigerant gas to be compressed from an outer air-conditioning circuit into said suction chamber, a suction port for fluidly communicating between said suction chamber and said compression chambers, an outlet port for discharging the compressed refrigerant gas from said discharge chamber toward the outer air-conditioning circuit, and a discharge port for fluidly communicating between said discharge chamber and said compression chambers;

a discharge valve means arranged on one end face of said valve plate for openably closing said discharge port of said valve plate;

a suction reed valve means arranged on the other end face of said valve plate and having a plurality of suction reed valves adapted to be moved between a closing position being in contact with said valve plate for closing said suction port and an opening position apart from said valve plate for opening said suction port, each suction reed valve having a substantial length extending in a diametrical direction of a corresponding one of said cylinder bores and being formed with a free end thereof, and;

a stop means formed as a plurality of recessed seats in said axial end face of said cylinder block for stopping said free end of each of said plurality of suction reed valves when each said suction reed valve is moved to the opening position thereof, wherein said each recessed seat of said stop means is formed with a first seat portion against which a first corner of said free end of said each suction reed valve abuts while being separated from said other end face of said valve plate by a first distance, and a second seat portion against which a second corner of said free end of said each suction reed valve abuts while being separated from said other end face of said valve plate by a second distance different from said first distance.

2. A piston type compressor according to claim 1, wherein said first and second corners of said free end of said each suction reed valve are formed as an arc-shaped tongue, respectively, and wherein said first and second seat portions of said each recessed seat are formed as an arc-shaped seat complementary to said arc-shaped tongue of said first and second corners, respectively.

3. A piston type compressor according to claim 2, wherein said first seat portion is approximately 1 mm in depth from said axial end face of said cylinder block and said second seat portion is approximately 1.4 mm in depth from said axial end face of said cylinder block.

4. A piston type compressor according to claim 2, wherein said first and second portions are separately recessed portions apart from each other in a circumferential direction of said axial end face of said cylinder block.

5. A piston type compressor according to claim 2, wherein said first and second seat portions are step-like portions of a common recess formed in said axial end face of said cylinder block, said first seat portion is less deep than said second seat portion in relation to said axial end face of said cylinder block.

6. A piston type compressor according to claim 5, wherein said first seat portion is less deep than said second seat portion in relation to an incline toward said second seat portion from a least deep position of said first seat portion.

7. A piston type compressor according to claim 2, wherein said first and second seat portions are curved portions of a common recess formed in said axial end face of said cylinder block, said first seat portion is less deep than said second seat portion.

8. A piston type compressor according to any one of claims 3 through 7, wherein said first seat portion is arranged at a position near to said inlet port, and said second seat portion is arranged at a position apart from said inlet port.

9. A piston type compressor according to claim 2, wherein said first corner of said free end of said each suction reed valve is less distance from the center line of said suction reed valve than said second corner of said free end portion of said suction reed valve.

* * * * *